Nov. 25, 1969    J. J. FRY    3,480,746
CONTROL UNITS FOR VALVE ACTUATORS
Filed Nov. 3, 1967    5 Sheets-Sheet 1
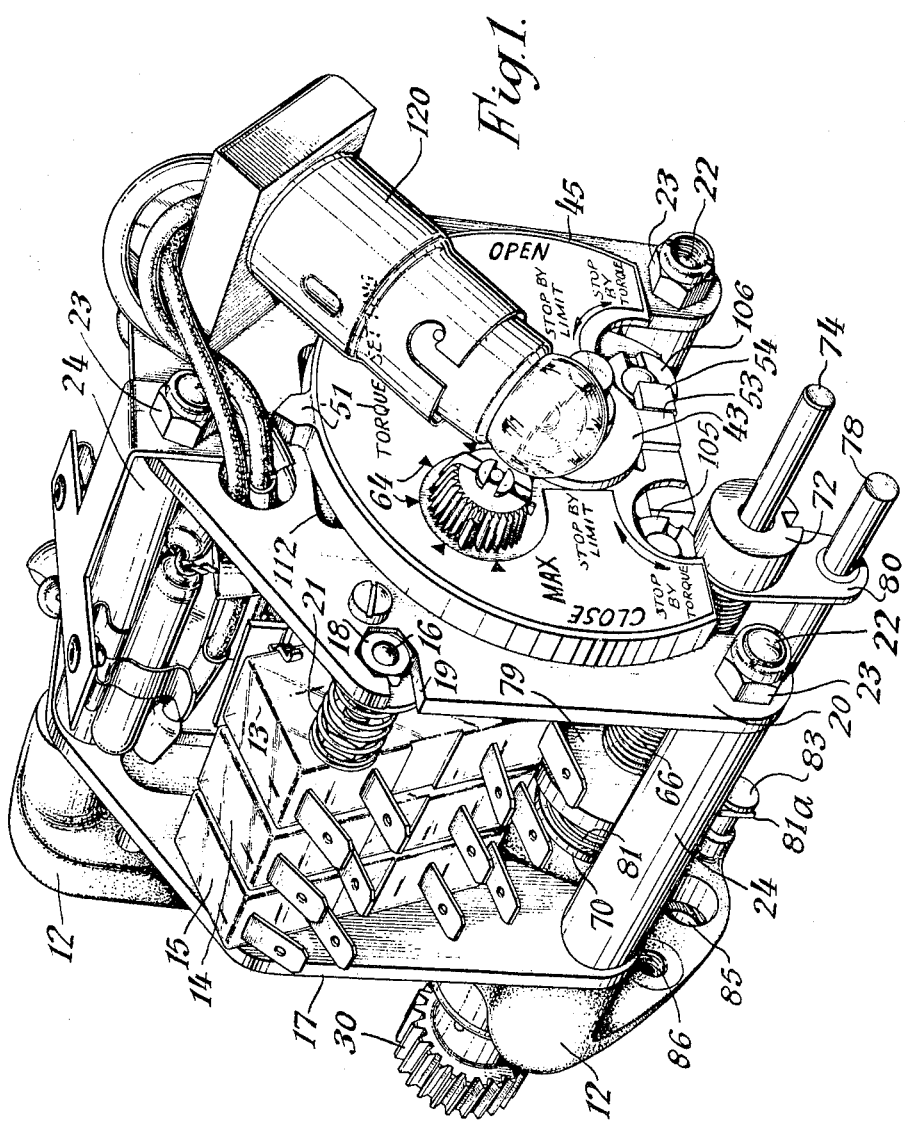
INVENTOR
JEREMY J. FRY
BY Stevens, Davis, Miller & Mosher
ATTORNEY.

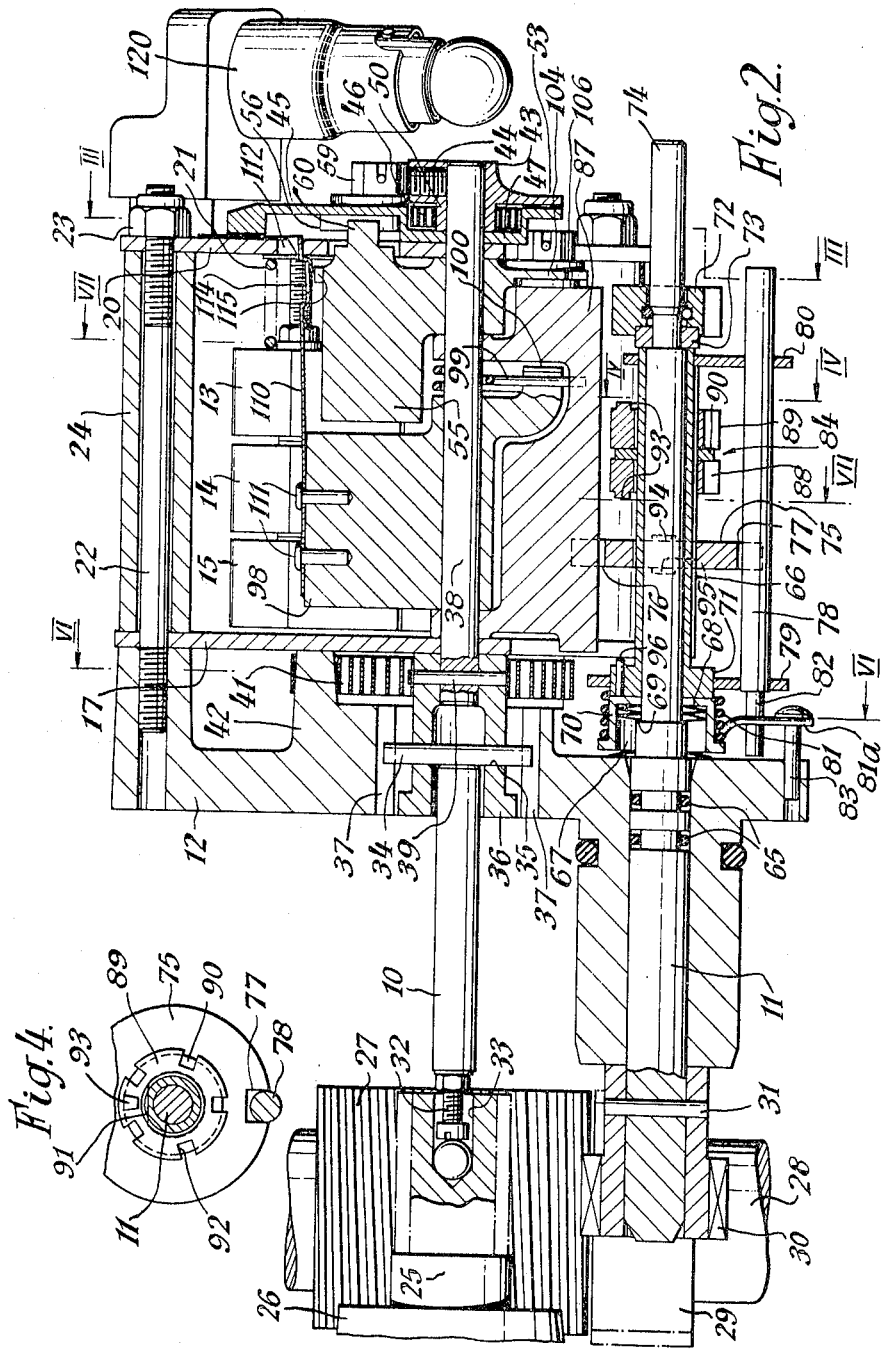

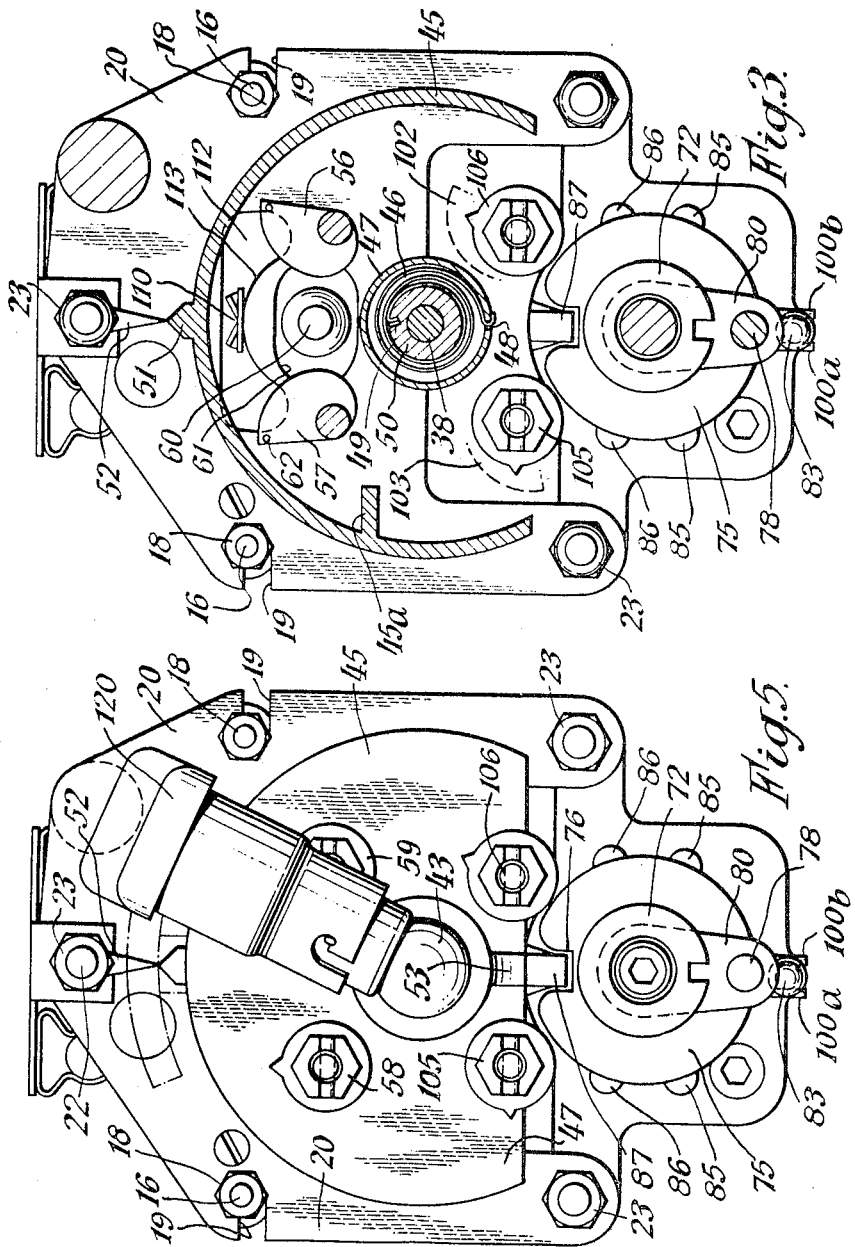

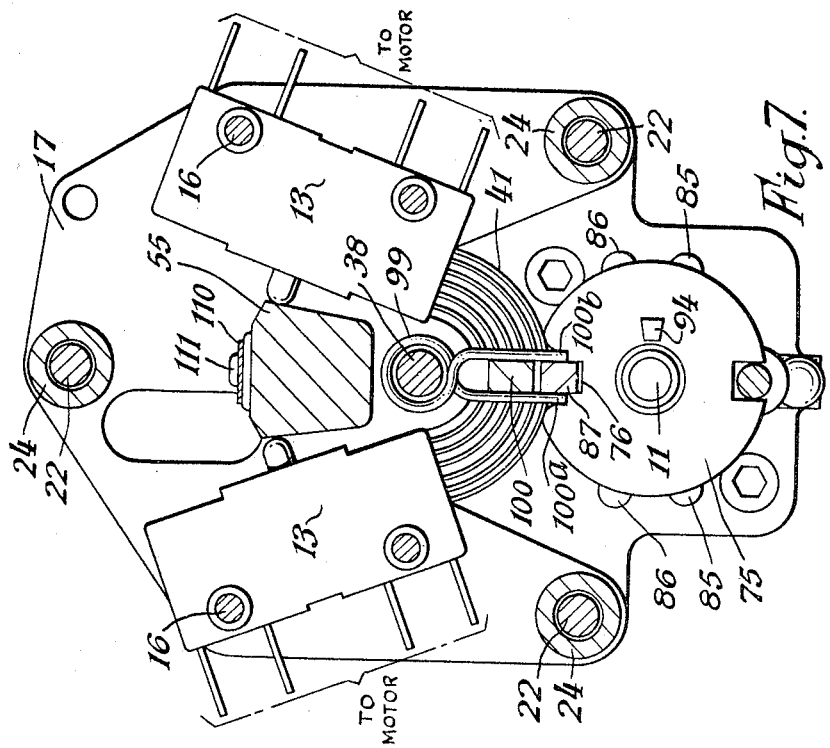
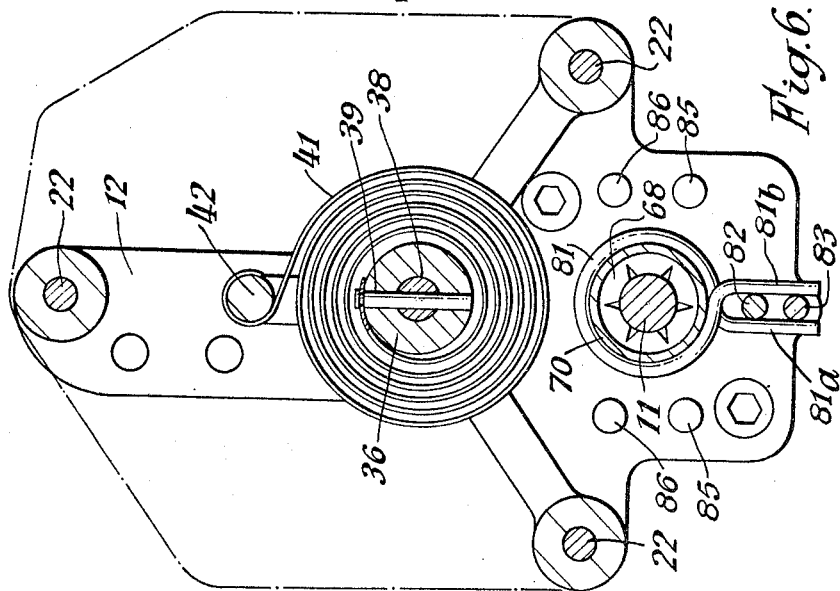

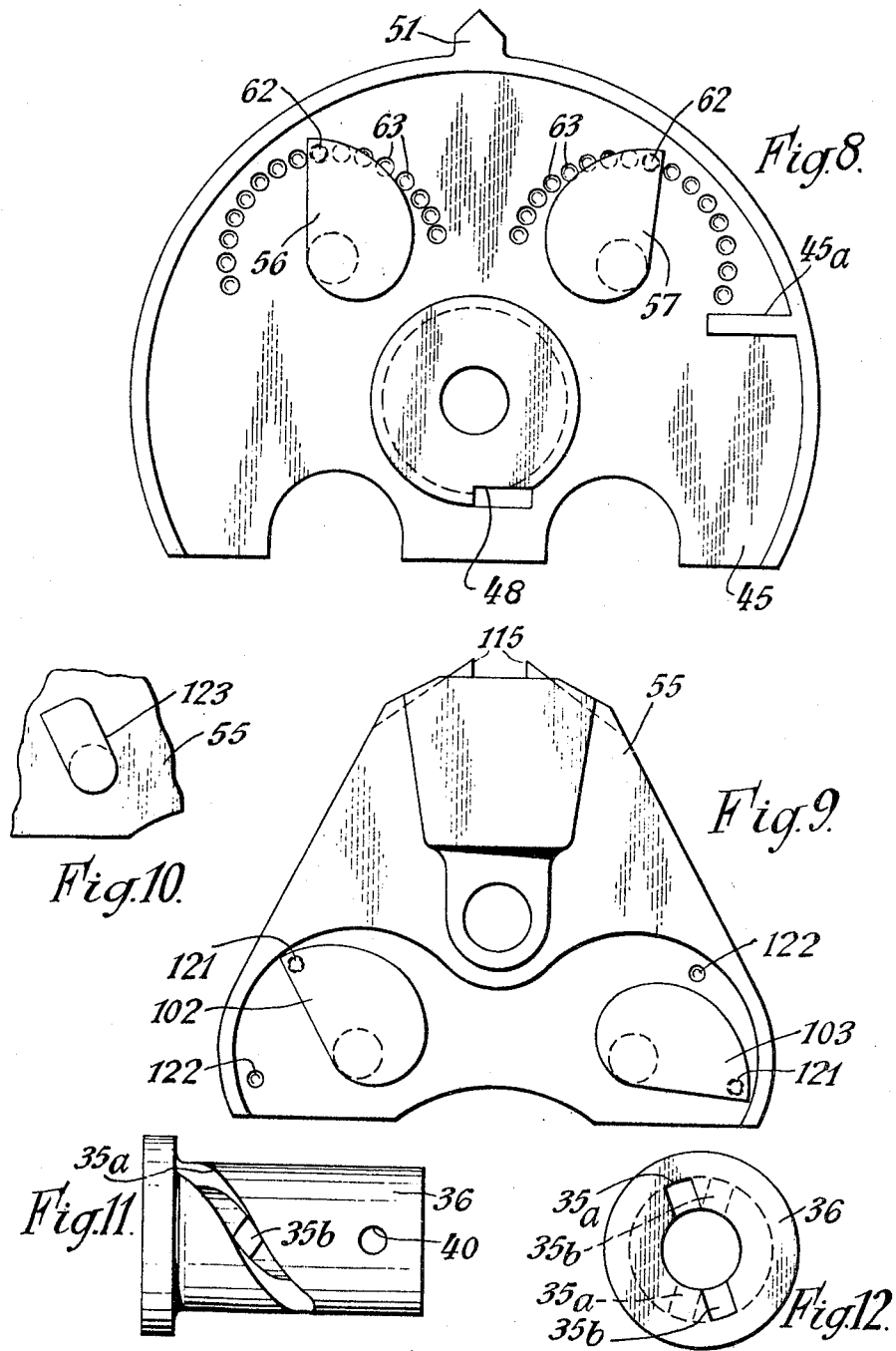

United States Patent Office 3,480,746
Patented Nov. 25, 1969

3,480,746
CONTROL UNITS FOR VALVE ACTUATORS
Jeremy J. Fry, Bath, Somerset, England, assignor to Rotork Controls Limited, London, England
Filed Nov. 3, 1967, Ser. No. 680,506
Claims priority, application Great Britain, Dec. 15, 1966, 56,186/66
Int. Cl. H01h *3/16, 3/18*
U.S. Cl. 200—47
10 Claims

ABSTRACT OF THE DISCLOSURE

The invention is concerned with a unit for the electrical control of the motor of a valve actuator. The motor circuit includes a pair of switches which are operable by the movement of a switch striker plate in one or other direction depending upon the direction of operation of the actuator. The plate is operable in response to the output thrust of the actuator under the control of a pair of cams which are manually adjustable to vary the torque setting. A second pair of manually adjustable cams controls the operation of the switch plate in response to the output movement of the actuator.

---

This invention relates to control units for motorised valve actuators in which ancillary circuits or operations are selectively controlled in response to the output movement of the actuator and/or the output force i.e. the thrust or torque of the actuator. In particular the invention is concerned with a control unit having a switch or pair of switches therein forming part of an electrical circuit operating the motor of the actuator, and in which the switch or switches are operated to de-energise the motor either as limit switches responsive to the output movement of the actuator or as torque responsive switches responsive to an increase in the output force of the actuator above a predetermined value.

The invention has particular use with valve actuators of the kind described in our U.S. Patent No. 3,198,033, and which include an output spindle or shaft which is capable of rotary movement to open or close the associated valve. The output shaft is selectively rotatable by manual means or by a motor driven shaft operating through a worm and wormwheel. The motor shaft is mounted for limited axial movement in response to any undue increase in the torque required for moving the valve to the desired position.

In its broadest aspect the invention provides an electrical control unit for an actuator and more particularly a valve actuator, said control unit having a switch or pair of switches forming part of an electrical control circuit, for example for operating the actuator motor, wherein said switch or pair of switches are operable by means which are responsive to one or more operating characteristics of the actuator and which include one or more manually operable cam members which are selectively adjustable so as to determine the mode of operation and/or the setting for operating said switch or pair of switches.

In the preferred embodiment of the invention the control unit firstly utilises the rotary movement of the output shaft of the actuator to operate the switch or switches as limit switches, and secondly utilises the axial movement of the motor shaft of the actuator to operate the switch or switches as torque responsive switches. The particular control of the switch or switches is selective and in the preferred embodiment the switches are actuated so as to deenergise the motor of the actuator.

The switch actuating mechanism comprises a pivotally mounted switch striker plate which is actuated by the torque responsive mechanism in accordance with the axial movement of the motor shaft. The axial movement of the motor shaft produces a rotary movement of a torque striker shaft on which the plate is mounted and this rotary movement is transmitted to a switch front plate which actuates the pivotally mounted switch striker plate through one of a pair of adjustable cams carried thereon. Adjustment of the cams provides for the desired torque setting required for operating the switches to de-energise the motor. The switch striker plate is also actuated by an output responsive mechanism which comprises a rotatable threaded shaft carrying a travelling nut which is normally restrained against rotation so that it moves axially between two limit positions. At the limit positions the nut rotates with the threaded shaft to pivot a striker plate in one or other direction. The pivotal movement of the striker plate is transmitted to the switch striker plate by means of one or other of a pair of adjustable cams carried by the switch striker plate. The arrangement is such that the cams can be adjusted so as to set the mechanism to operate either on "limit" or "torque" according to the type of pipeline valve to be operated. When the setting is by "limit" the cams on the switch striker plate are contacted by the striker plate of the output responsive mechanism, but when the setting is by "torque" the cams are in a position in which they are prevented from contact by this plate.

The invention will now be described by way of example with reference to the accompanying drawings, in which:

FIGURE 1 is a perspective view of the control unit in accordance with the invention;

FIGURE 2 is a longitudinal section through the control unit of FIGURE 1 and illustrating also the connection of the control unit with the output mechanism of the actuator;

FIGURE 3 is a sectional view taken along the line III—III of FIGURE 2;

FIGURE 4 is a detail end view of the adjustable stop member taken on the line IV—IV of FIGURE 1;

FIGURE 5 is a front view of a control unit of FIGURE 2;

FIGURE 6 is a sectional view taken on the line VI—VI of FIG. 2;

FIGURE 7 is a sectional view taken on the line VII—VII of FIGURE 2;

FIGURE 8 is a rear view of the torque switch front plate showing in particular the manually operable cams for adjusting the torque setting;

FIGURE 9 is a rear view of the switch striker plate showing in particular the manually operable cams for selecting operation of the front switches as limit switches in accordance with the output movement of the actuator;

FIGURE 10 is a detail view showing an alternative form of cam for use on the switch striker plate of FIGURE 9;

FIGURE 11 is a side elevation of the torque switch adaptor; and

FIGURE 12 is an end view of the adaptor of FIGURE 11.

The preferred embodiment of the invention as illustrated in the drawings is particularly applicable to valve actuators; for example the valve actuator as described in our U.S. Patent No. 3,198,033.

The valve actuator described in this patent specification includes a hand/auto arrangement and has a motor shaft or spindle which, by means of a worm and wormwheel, drives an output shaft which may be manually operated if desired.

The control unit of the invention is located in an auxiliary casing (not shown) which forms part of the actuator and is operated in response to the output movement and the output force or torque of the actuator by a pair of shafts 10 and 11 respectively which extend through a base plate or partition 12 into the control unit housing as will be hereinafter described.

The control unit includes a number of switches which are arranged in two banks for operation depending upon the direction of movement of the actuator. In the preferred embodiment as shown in the drawings six switches are provided in two banks of three for operation depending upon the direction of movement of the actuator. One bank of switches is shown in FIGURE 1 of the drawings while the other bank of switches is shown in the sectional view of FIGURE 2. The front pair of switches 13 are particularly adapted for the control of the electrical circuit energising the electrical motor of the actuator while the other pairs of switches 14 and 15 are utilised in the usual way for the control of ancillary circuits or other operations.

The mounting of each bank of switches is designed so that the switches can be easily removed from the control unit and exchanged. As shown in FIGURE 1 of the drawings each bank of switches 13, 14 and 15 is carried by a mounting screw 16 the head of which (not shown) is located in an electrical back plate 17 while a hexagonal nut 18 on the other end of the mounting screw 16 is slotted into a suitably shaped hole 19 in an electrical front plate 20. The switches in each bank are retained resiliently in position by a spring 21 located on the mounting screw 16.

The electrical back plate 17 and the electrical front plate 20 are connected together by a number of connecting bolts 22 the heads of which threadably engage in the base plate or partition 12 as shown particularly in FIGURE 2 of the drawings while the other end is provided wtih a clamping nut 23, the bolt 22 being provided with a spacer member 24 for maintaining the electrical plates correctly positioned.

As will be hereinafter described the front pair of switches 13 can be selectively operated either as limit switches responsive to the output movement of the actuator, or as torque switches responsive to the output force of the actuator. This selection can be made according to the type of pipeline valve to be operated and when the switches 13 are operated as limit switches the motor will be de-energised when the valve has moved to predetermined positions as controlled by the setting of the limit switch actuating mechanism of the control unit. When the switches 13 operate as torque responsive switches the motor will be de-energised in response to any increase in the output force of the actuator above a predetermined value and which is transmitted to the control unit by the motor shaft of the actuator which is mounted for limited axial movement in either direction as described in our U.S. Patent No. 3,198,033.

The main casing of the actuator supports the motor shaft which is shown in FIGURE 2 of the drawings by the reference 25 and on which is mounted a worm 26 engaging a wormwheel shown diagrammatically at 27 on the output shaft 28. The output shaft 28 is provided with a worm 29 meshing with a wormwheel 30 fixedly mounted by a pin 31 to the limit switch shaft 11 previously mentioned. The limit switch shaft 11 is therefore rotatably driven in one or other direction in accordance with the rotational movement of the output shaft 28 and this movement of the limit shaft is utilised to operate one or more of the switches 13, 14 and 15.

The torque responsive mechanism comprises the shaft 10 which as mentioned above is movable axially by the worm or motor shaft 25 of the actuator. The shaft 10 is provided with an adjustable connecting screw 32 which fits within the aperture 33 in the end of the motor shaft 25. The other end of the shaft 10 extends into the bore of a torque switch adaptor 36 which abuts against the electrical back plate 17 and is mounted within an aperture in the base plate or partition 12. The end of the shaft 10 pushes against a pin 34 which is carried in a pair of helical slots 35a, 35b and which are diametrically opposed in the body of the adaptor. The arrangement is shown more clearly in FIGURES 11 and 12 of the drawings and it will be seen from FIGURE 11 that the slots extend approximately half the length of the body of the actuator while from FIGURE 12 it will be seen that the angular extent of each of the helical slots is approximately 220°. The ends of the pin 34 are located in axial slots 37 in the base plate or partition 12. The ends of the pin 34 are thereby restrained against any rotary movement and any axial movement of the shaft 10 thereby produces axial movement of the pin 34 along the slots 37. This movement of the pin 34 produces a rotary movement of the torque switch adaptor 36 due to the movement of the pin 34 along the helical slots 35a, 35b in the adaptor.

One end of a torque shaft 38 is also located in the bore of the torque switch adaptor 36 and is pinned to it by a pin 39 which is mounted in the aperture 40 shown in FIGURE 11 of the drawings. One end of the pin 39 as shown in FIGURE 6 of the drawings also secures one end of a spring 41 the other end of which is located around a projection 42 of the base plate or partition 12. The spring 41 preloads the torque shaft assembly of the shaft 38 and the adaptor 36 and thereby ensures that the complete assembly is always in contact with the end of the shaft 10 so that any axial movement of the worm shaft 25 in either direction will always cause a corresponding rotary movement of the shaft 38. In other words if the shaft 10 moves axially to the left as shown in FIGURE 2 the shaft 38 will rotate due to the following movement of the adaptor 36 by reason of the preloading of the spring 41 acting thereon.

The front end of the shaft 38 extends through the electrical front plate 20 and carries a pointer plate 43 which is fixed to the shaft by means of a grub screw 44. A switch front plate plate 45 is mounted behind the pointer plate 43 and is freely located on the shaft 38. The switch front plate 45 is connected to the pointer plate 43 by means of a spring 46 which loads a lug 54 on the switch front plate 45 against a projection 53 on the pointer plate 43 (see FIGURE 1). The switch front plate 45 thereby follows the movements of the pointer plate 43 fixedly secured to the shaft 38 without being rigidly connected thereto. As shown in FIGURE 2 of the drawings the spring 46 is located within a circular housing portion 47 formed in the switch front plate 45. One end of the spring 46 is located within a slot 48 formed in the peripheral wall of the housing portion 47 of the plate while the other end of the spring is located in a slot 49 in a projecting portion 50 of the pointer plate 43 (see FIGURES 3 and 8).

The switch front plate 45 is also provided with a pointer 51 and which is adapted to co-operate with a fixed pointer 52 secured by the nut 23 on the upper connecting member 22. The fixed pointer 52 is mounted externally of the electrical front plate 20 and it permits the initial adjustment of the switch front plate 45 so that the plate 45 can be correctly set to a central position whereby each bank of switches is operated in a similar manner. This initial setting of the plate 45 is obtained by releasing the grub screw 44 and adjusting the pointer plate 43 until the pointer 51 of the plate 45 is opposite fixed pointer 52 carried by the electrical front plate 20.

The front pair of switches 13 is selectively actuated by a switch striker plate 55 which is rotatably mounted on the striker shaft 38 and is located between the two switches for operating one or other switch in accordance with the operation of the actuator.

The switch striker plate 55 is pivotally moved to operate the switches 13 in response to rotary movement of the switch front plate 45. The torque applied by the actuator is set by limiting the amount of rotary movement of the switch front plate 45 before it actually moves the switch striker plate 55 against the appropriate switch 13. This adjustable control is obtained in accordance with the invention by mounting two adjustable cam members 56, 57 on the inside surface of the switch front plate 45 as shown more clearly in FIGURE 8 of the drawings. The cams 56, 57 are spaced one on each side of the striker shaft 38 and the cams are independently controlled by manually operable knobs 58, 59 located on the front surface of the switch front plate 45 (see FIGURE 5). The cams 56 and 57 are suitably shaped, for example as shown in FIGURE 8 of the drawings, so as to contact a projection 60 of the switch striker plate 55 which extends forwardly through an aperture 61 in the electrical front plate 20 of the control unit (see also FIGURE 3).

The arrangement as described above is such that when the striker shaft 38 is rotated in one or other direction in response to axial movement of the torque shaft 10, this rotation of the striker shaft 38 also rotates the pointer plate 43 and thereby the switch front plate 45. The movement of the switch front plate 45 causes one or other of the cams 56, 57 to contact the switch striker plate 55 which thereby pivots to operate the appropriate motor switch 13. It will be appreciated that the switch 13 is actuated in accordane with an output force or torque the amount of which is determined by the manual setting of the cams 56, 57 carried by the switch front plate 45.

As mentioned above the terminal external manual control for the cams 56, 57 on the switch front plate 45 comprises knobs 58 and 59 which are provided with several positive settings between a minimum and a maximum position. As shown in FIGURES 3 and 8 each cam is provided with a notch 62 engageable in one of a series of depressions 63 formed on the inner surface of the switch front plate 45. The outer surface of the switch front plate 45 is provided with indicating position 64 so as to enable the operator to provide the desired torque setting. The particular cam 56 associated with the "open" switch 13 may also be provided with a position which will permit the full power of the motor to be used without causing any operation of the motor switch 13. This position may be indicated on the front surface of the plate 45 by a "boost" position and the design of the cam is such that in this position it will not contact the switch striker plate 55 to operate the plate during the rotation of the switch front plate 45. It is, of course, possible to provide such a position on both cams 56, 57, if desired, so that the cams can be manually adjusted to a position in which neither switch 13 will be controlled in accordance with the output force or torque of the actuator. Normally, however, only the cam 56 operating the "open" switch 13 will be provided with a "boost" position and, as shown in FIGURE 8, the cam 57 is prevented from rotating to such a position by its control knob 58 by a projection 45a extending inwardly of the switch front plate 45.

As previously mentioned, the switches 13 may also be operated in accordance with the output movement of the actuator and this limit position control, which will now be described, is also utilised to actuate the additional switches 14 and 15 controlling the ancillary circuits The input for the limit input control comprises the limit switch shaft 11 previously mentioned and which extends into the control unit through the base plate or partition 12.

The limit switch shaft 11 is sealed within the base plate or partition 12 of two O-rings 65 and inside the control unit casing the shaft supports on its outer diameter a hollow threaded spindle 66.

The limit switch shaft 11 drives the hollow threaded spindle 66 through a clutch shown generally by the reference numeral 67 and which is mounted on the end of the spindle 66 adjacent the base plate or partition 12. The clutch 67 comprises a set of spring disc washers 68, which washers are located on the shaft 11 and positioned between a shoulder 69 on the shaft and the inner surface of a cup-shaped spacer member 70 which surrounds the spring disc washers 68. The spacer member 70 is engaged by a fixed flange 71 on the adjacent end of the hollow threaded spindle 66 and the spring disc washers 68 are pre-loaded by a clamping nut 72 and washer 73 which are located at the other end of the shaft. The washer 73 abuts the other end of the hollow threaded spindle 66 and the nut 72 is threaded on a shaft 74 which extends from the end of the shaft 11 into which it is fitted for movement therewith, for example for operating a continuously movable indicator pointer (not shown). The adjustment of the nut 72 on the shaft 74 engages the washer 73 against the end of the threaded spindle 66 so as to adjust the loading of the spring disc washers 68 which maintain the friction drive between the shaft 11 and the spindle 66.

A movable nut 75 is threadably mounted on the hollow spindle 66 and is formed with axial slots 76, 77 in its periphery at diametrically opposed positions. The nut 75 is normally held against rotation with the threaded spindle 66 by a nut guide which comprises a rod 78 extending longitudinally with the spindle 66 but spaced therefrom. The rod 78 engages the slot 77 in the nut 75 and it is supported at its ends by plates 79, 80 loosely mounted respectively on the fixed flange 71 and the outer end of the spindle 66.

The nut guide is spring-loaded into a central position as shown in FIGURES 2 and 6 by a return spring 81 which is positioned around the cup-shaped spacer member 70. The ends 81a, 81b of the return spring 81 cross over each other just below the cup-shaped spacer member 70 (see FIGURE 6) and the ends are then located one on each side of an extension 82 of the rod 78 and a fixed retainer pin 83 mounted in the base plate or partition 12.

The nut 75 is therefore constrained to move axially along the hollow spindle 66 in one or other direction depending upon the output movement of the actuator to open or close the associated valve. In the leftward direction of movmeent, as viewed in FIGURE 2, the travelling nut 75 engages a fixed stop which comprises the fixed flange 71 on the threaded spindle 65, and in the rightward direction of movement it engages an adjustable stop 84 on the spindle 66 as will be hereinafter described. When the travelling nut 75 engages either one of the stop members it is forced to rotate with the hollow threaded spindle 66 and this rotational movement of the nut 75 is utilised to oprate the switches 13 to de-energise the motor of the actuator. For example, the fixed stop member 71 may cause the nut 75 to rotate to de-energise the motor when the valve reaches its closed position, while the adjustable stop 84 can be suitably positioned on the spindle 66 to rotate the nut 75 to de-energize the motor when the valve has moved to a predetermined open position This movement of the valve to its open position, as determined by the number of turns of the threaded spindle, can be preset for the switch mechanism so that the control unit can be immediately applied to an actuator without any further adjustment.

Excess rotational movement of the nut 75 is prevented by the engagement of the projection 82 of the rod 78 of the nut guide with stops on the base plate or partition 12. Two sets of stops are provided for use depending on the speed of operation of the actuator. The first set of stops (not shown) are positioned in apertures 85 and are intended for low speed actuator operation, while the second set of stops are positioned in apertures 86, and are intended for high speed operation in which case the first stops are tapped into the base plate 12 flush with the face so that the second stops in apertures 86 are used.

The lower edge of a longitudinally extending striker plate 87 engages the other peripheral slot 76 in the travelling nut 75. The striker plate 87 is pivotally mounted about the torque shaft 38. The pivotal movement of the plate 87 by the nut 75 is utilised to actuate the switches 13, 14 and 15 as will be hereinafter described.

The adjustable stop member 84 is shown more clearly in FIGURES 2 and 4 and comprises a pair of lock nuts 88 and 89 between which is positioned a locking washer 90. The arrangement forms the subject matter of my copending United States patent application Ser. No. 677,943, filed Oct. 25, 1967, entitled Improvements in or Relating to Control Units, More Particularly for the Electric Circuit of Valve Actuators, to which reference should be made for more detailed information. Briefly, however, the threaded surface of the spindle 66 is provided with a flat 91 (FIGURE 4) which extends the whole length of the thread on the spindle 66 so that the cross-sectional shape of the spindle is substantially D-shaped. The locking washer 90 is provided with a D-shaped aperture which corresponds to the cross-sectional shape of the spindle so that the locking washer fits snugly thereon with the flat of the washer fitting the flat of the spindle. The arrangement is such that the washer 90 is adjustable slidably along the spindle 66 but is unable to rotate relatively thereto. The two lock nuts 88 and 89 are therefore tightened against the washer 90 in the desired limit position and the arrangement ensures that the adjustment is positive and non-slipping. No loss of adjustment can occur and it is only necessary to finger tighten the nuts 88 and 89 against the locking washer 90. The arrangement is not only simple but it provides for easy adjustment without the necessity of excessive tightening to prevent loss of adjustment during operation of the actuator. It will, however, be seen that the lock nuts are provided with axial grooves 92 in their periphery to enable the tightening of the nuts by tools if desired.

The construction of the adjustable stop member 84 is completed by a projection 93 on the outer surface of the lock nut 88. This projection is adapted to engage a corresponding projection 94 on the adjacent surface of the travelling nut 75 in one extreme limit position. The arrangement prevents any binding between the travelling nut 75 and the adjustable stop 84 which would probably occur if the projections were not provided. A similar projection 95 is provided on the other surface of the travelling nut 75 for engagement with a pin 96 mounted in the fixed flange 71 at the end of the spindle 66 in the other extreme limit position. The lock nuts 88 and 89 are, of course, interchangeable and therefore the lock nut 89 is also provided with a similar projection 93 on its outer surface.

The clutch 67 provides a safety device as the limit switch shaft 11 can continue to rotate relatively to the spindle 66 when the travelling nut 75 reaches one of its extreme positions of movement and until the motor is de-energised.

The clutch 67 also provides a self-setting device for the actuator whereby the adjustable stop member 84 may be positioned to suit the limit positions of the valves. For example, after the control unit has been mounted on the actuator, the motor is energised to drive the valve to its closed position and the motor is maintained in operation until the valve is closed irrespective of the engagement of the traveling nut with the fixed stop member, i.e., the pin 96 on the fixed flange 71 of the threaded spindle 66, as the clutch 67 will permit relative rotational movement of the shaft 11 and spindle 66. At this time the valve closed position of the actuator is identified with the engagement of the projection 95 on the travelling nut 75 with the pin 96 on the fixed flange 71 and the open position of the valve will be in accordance with the de-energisation of the motor due to the engagement of the travelling nut 75 with the adjustable stop member 84 as described above. The adjustable stop member 84 can be easily and quickly positioned to predetermine the opening movement of the valve by the number of turns along the threaded spindle 66 from the fixed flange 71.

The pairs of switches 14 and 15 for the ancillary circuits are operable by an auxiliary striker blade 98 which is also rotatable about the striker shaft 38 and which is resiliently attached to the striker plate 87 by means of a spring connection 99. As shown in FIGURE 7 the spring 99 is located around the shaft 38 and has its ends 100a, 100b crossed and then located one on each side of the projection 100 of the auxiliary striker blade 98 and also the striker plate. This arrangement prevents any damage to the switches especially in actuators which operate at a high speed as it prevents overtravel and thus simplifies the setting up of the switches and plate operating mechanism.

The front pair of switches 13 is selectively actuated by the limit control mechanism through the switch striker plate 55. The striker plate 87 is drivably connected with the switch striker plate 55 by means of a pair of cams 102, 103 shown in FIGURES 3 and 9 of the drawings and which are adjustably mounted on the inside surface of a flat extension 104 at the lower end of the switch striker plate 55. The cams are manually rotatable by knobs 105, 106 on the front of plate 55 and the arrangement is such that the front end of the striker plate 87 will engage one or other of the cams 102, 103 so as to rotate the switch striker plate 55 to operate one or other of the motor switches 13. It will be appreciated that by rotating the cams 102, 103 the operation of the motor switches may be set as desired and the cams are so designed as to provide for a position in which the switches 13 are completely inoperative by the movement of the striker plate 87 so that the switches 13 are solely torque operated. The cams 102, 103 have a detent 121 engageable with depression 122 in plate 55 to establish either one of the two positions of movement. In FIGURE 9 cam 102 is in the "limit" position for control of the "open" switch 13, while cam 103 is in the "torque" position so that "close" switch 13 would operate solely in response to torque. FIGURE 10 shows an alternative and simplified construction 123 which may be substituted for cams 102 and 103. Another feature of this arrangement is that the requirement for the auxiliary switches 14, 15 to be operated slightly before the motor switches 13 is achieved and manufacturing tolerances on the switches which causes a variation in the tripping point are also overcome.

In the operation of the control unit as described above, difficulty sometimes occurs when the motor is de-energised; for example when the valve has reached its closed position. At this time it usually requires a greater torque to move the valve towards its open position particularly if the valve has remained closed for any length of time. In prior arrangements energisation of the actuator in the open direction to try to open the valve has immediately caused an axial movement of the motor driven shaft 25 in the opposite direction due to the considerable increase in output force and this has resulted in the switch striker plate 55 pivoting across immediately to operate the other one of the pair of switches 13 thus de-energising the actuator motor without effecting any opening movement of the valve.

The particular embodiment of the control unit as shown in the drawings avoids this difficulty by providing a latching arrangement which is more particularly described in my copending United States patent application Ser. No. 680,579 filed Nov. 3, 1967, entitled Improvements to Control Units for Valve Actuators. Briefly, the latching arrangement comprises a latch spring 110 attached by rivets 111 to the top of the auxiliary striker blade 98 and the front end of which projects into an opening 112 in the electrical front plate 20 (FIGURE 3). The bottom surface of the opening 112 has a cam surface 113 so that in the central position of the auxiliary striker blade 98 the spring 110 is held upwardly by the cam surface 113 in a position as shown in FIGURES 2 and 7 away from the top surface of the switch striker plate 55. The latch spring 110 is provided with a square hole 114 which is positioned above the switch striker plate 55 and the switch striker plate is provided with a pair of projections 115 (FIGURE 9) on its upper surface which will in certain positions of the plate locate into the hole 114.

When the actuator, for example in closing the valve has stopped in the closing direction on limit setting, the striker plate 87, the switch striker plate 55 and the auxiliary striker blade 98 have all moved to one side to operate the "close" bank of switches. In so doing the latch spring 110 also moves sideways with the auxiliary striker blade 98 and due to the shape of the cam surface 113 the spring will now drop downwardly so as to engage its square hole 114 over a projection 115 on the top of the switch striker plate 55.

If now the actuator is operated for opening the valve the latch spring 110 by reason of its engagement with the projection 115 on the switch striker plate 55 prevents this plate from moving across to operate the opposite switch 13 until the actuator has unseated the valve and the limit switch drive through shaft 11 has begun to rotate thus moving the auxiliary switch blade 98 back to release the spring 110 which rides up the cam surface 113 and thus disengages from the switch striker plate 55.

The arrangement allows two or three turns of the actuator before release of the latch spring 110 which should be sufficient for the actuator to have successfully unstuck the valve so that the possibility of the opposite switch 13 being operated is eliminated.

The mechanism also carries a lamp 120 to illuminate the associated indicating mechanism and which can be easily moved aside to allow access to the adjusting knobs 58, 59, 105 and 106. A heater (not shown) may also be provided.

I claim:
1. An electrical control unit for a valve actuator responsive to the operating characteristics of the actuator and comprising: a pair of switches forming part of an electrical control circuit; first striker means pivotally mounted about an axis and between said pair of switches for operating one or the other switch in accordance with the movements of the actuator; second striker means pivotally mounted on said axis and capable of causing said first striker means to pivot; at least one further pair of switches forming part of ancillary electrical circuits; third striker means pivotally mounted on said axis for operating said further switches; means for resiliently coupling said second and third striker means so that rotation in said second striker means causes rotation in said third striker means; means for causing said first striker means to pivot in response to an axial movement in a shaft and to thereby control said switches; means for causing said second striker means to pivot in response to rotational motion in a further shaft; and means for pivoting said first striker means in response to the pivoting of said second striker means.

2. The invention as recited in claim 1, and further comprising at least one manually operable cam member which is selectively adjustable so as to determine both the mode of operation and the setting for operating said pair of switches.

3. The invention of claim 1 in which the pair of switches is selectively operable in response to both the output movement of the actuator and the output force of the actuator.

4. A control unit as defined in claim 1, wherein said first striker means is pivotally mounted on a torque striker shaft rotatable in one or the other direction in accordance with the axial movement of the motor shaft of the actuator, and wherein said first striker means is connected with a rotatable switch front plate, and switch front plate actuating said first striker means through one of a pair of adjustable cam members mounted thereon.

5. A control unit as recited in claim 4, wherein the switch front plate is mounted on said torque striker shaft for rotation relatively thereto and is drivably connected with a front pointed plate fixedly secured to the torque striker shaft through resilient means.

6. A control unit as defined in claim 4, wherein the adjustable cam members are manually operable so as to select a desired torque setting for actuating the switches, said adjustable cam members selectively contacting a projection on said first striker means depending upon the direction of axial movement of said motor shaft.

7. A control unit as claimed in claim 1, wherein the output responsive mechanism comprises a threaded shaft rotatably movable in response to the output movement of the actuator, a nut mounted on said threaded shaft and normally restrained against rotation so as to travel along the shaft in accordance with the rotation thereof, and wherein said second striker means is engageable by said nut and is rotated thereby as the nut reaches one or other of its extreme positions of movement along the threaded shaft.

8. A control unit as recited in claim 7, in which the second striker means engages a notch in the periphery of the travelling nut.

9. A control unit as defined in claim 7, wherein the second striker means is adapted to selectively engage one of a pair of adjustable cam members mounted on the first striker means.

10. A control unit as recited in claim 9, wherein the adjustable cam members mounted on said first striker means are movable between two positions in one of which the cam members are prevented from contact by the second striker means, so that the switches are operable solely in accordance with the output force of the actuator.

References Cited

UNITED STATES PATENTS

| | | | |
|---|---|---|---|
| 2,151,493 | 3/1939 | Acker | 192—150 |
| 3,209,090 | 9/1965 | Fry | 192—141 XR |
| 3,341,760 | 9/1967 | Fry | 318—469 |
| 3,384,800 | 5/1968 | Norris et al. | 318—466 XR |

CARLTON R. CROYLE, Primary Examiner

A. O. HERRMANN, Assistant Examiner

U.S. Cl. X.R.

192—141, 142, 150; 200—61.86; 318—469, 475